United States Patent [19]

Krieger

[11] Patent Number: 5,090,762
[45] Date of Patent: Feb. 25, 1992

[54] AUTOMOTIVE DOOR TRIM PANEL PROTECTOR AND METHOD OF USING THE SAME

[75] Inventor: Paul A. Krieger, Olmsted Falls, Ohio

[73] Assignee: The Excello Specialty Company, Cleveland, Ohio

[21] Appl. No.: 604,949

[22] Filed: Oct. 29, 1990

[51] Int. Cl.[5] .......................... B32B 3/02; B32B 3/28
[52] U.S. Cl. .................................. 296/39.1; 296/901; 428/80; 428/81; 428/182
[58] Field of Search .................... 296/39.1, 901, 152; 428/80, 81, 181, 182, 343

[56] References Cited

U.S. PATENT DOCUMENTS

| | | | |
|---|---|---|---|
| 2,001,136 | 5/1935 | Holderbach | 296/39.1 X |
| 3,387,409 | 6/1968 | Gorys et al. | 296/39.1 X |
| 4,268,000 | 5/1981 | Ulm | 428/81 X |
| 4,696,848 | 9/1987 | Jones et al. | 428/80 |
| 4,775,180 | 10/1988 | Phillips | 296/97.8 X |
| 4,883,304 | 11/1989 | Elliott | 296/97.8 |

FOREIGN PATENT DOCUMENTS 3600745  7/1986  Fed. Rep. of Germany ..... 296/39.1

Primary Examiner—Johnny D. Cherry
Assistant Examiner—Joseph D. Pape
Attorney, Agent, or Firm—Fay, Sharpe, Beall, Fagan, Minnich & McKee

[57] ABSTRACT

A protector sheet article and method intended for application to the door trim panel of a vehicle door to prevent soiling or damage to the trim panel during vehicle assembly and shipping. The article comprises a sheet of thin flexible plastic film with an outer periphery which generally corresponds to the size and shape of the trim panel. The sheet is provided with a plurality of adhesive coated tab members for engagement with closure areas of the vehicle door to hold the sheet in position on the trim panel.

8 Claims, 2 Drawing Sheets

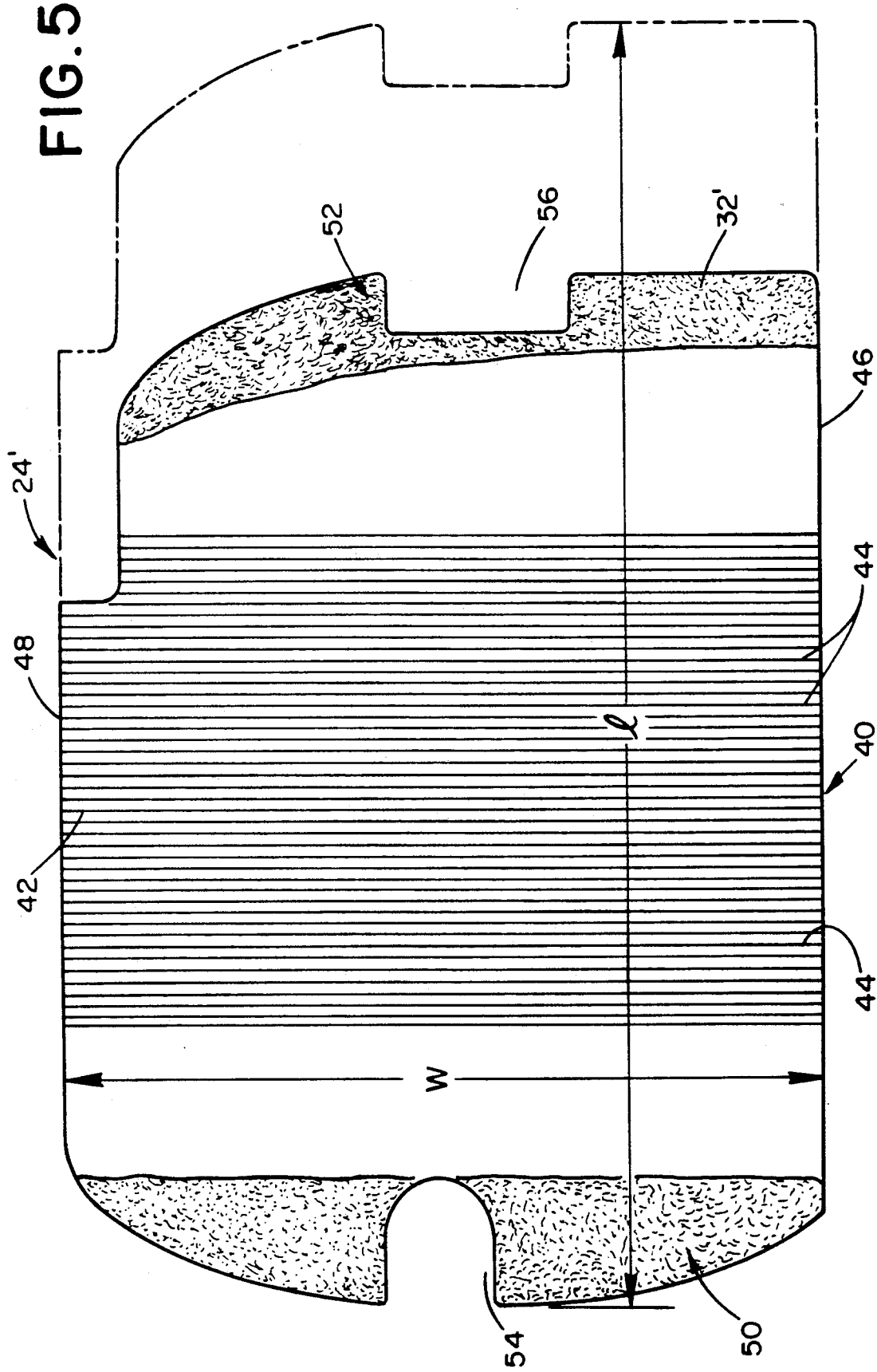

AUTOMOTIVE DOOR TRIM PANEL PROTECTOR AND METHOD OF USING THE SAME

BACKGROUND OF THE INVENTION

The subject invention is directed toward the art of protective devices and, more particularly, to a protector sheet and method of using the same to protect vehicle door trim panels.

During the manufacture of vehicles, the final assembly and delivery of the vehicles requires that workers enter the vehicles for final testing and the like. In addition, the vehicles must normally be driven at this time. During this period, as can be appreciated the interior surfaces of the vehicle are subject to soiling. The inner trim panels of the doors are particularly susceptible to dirt and are difficult to protect.

Previously, the inner trim panels have been protected by continuous, sheets of plastic film that extended over the exposed outer surface of the panels. Some of the protective sheets were thermoformed to have a contour to trim panel and appurtenant structures. Typically, however, the sheets were flat. End portions or tabs on the sheets were bent around the ends of the panels and joined to the panel attachment clips or fasteners used to attach the trim panels to the door body. When the vehicle arrived at the dealership, the sheets were torn-off and the tabs normally remained out of sight behind the trim panel.

The prior method of applying protector sheets as described above had a distinct disadvantage. In particular, the sheets had to be applied early in the assembly process, i.e, simultaneously with the trim panels. Moreover, the presence of the sheets tended to interfere, at times, with subsequent assembly and inspection processes. Consequently, it would be preferred to apply such protector sheets at a later point in the assembly process.

Further problems are present with the prior protector sheets and their method of attachment. For example, at times the tabs did not tear-off cleanly and ends of the plastic tabs extended out from behind the trim panels. This was unsightly and difficult to remove.

An additional problem present was that the protector sheets could not be temporarily removed and then reinstalled. Moreover, the protector sheet's shape and method of attachment made it extremely difficult to access and work on the door trim panel covered by the protector sheet or the associated door mechanisms if such was necessary.

As a consequence of the above, there has been an ongoing need for a new protector sheet and method of applying the same. The subject invention provides an improved protector sheet construction which overcomes the noted problems in an extremely efficient and effective manner. The invention also contemplates a method of using the improved protector sheets which allows them to be temporarily removed and subsequently replaced.

SUMMARY OF THE INVENTION

In particular, the subject invention provides a protector sheet article intended for application to the inner door trim panel of a vehicle door of the type which includes laterally facing peripheral edge portion closure areas that are generally perpendicular to the trim panel. The protector sheet is intended to prevent soiling or damage to the trim panel during vehicle assembly and shipping. Specifically, the protector sheet article of the invention comprises a continuous impervious sheet of relatively thin and flexible plastic film material having a width w and a length 1. The width w is at least substantially as great as the height of the trim panel and the length 1 is at least substantially as great as the horizontal width of the trim panel. In addition, the outer periphery of the sheet has a general extent and shape which is at least correspondingly as large and coextensive to the size and shape of the trim panel. Extending outwardly from at least the opposite end portions of the sheet are a plurality of tab members having a length sufficient to extend over and beyond the side edges of the trim panel for engagement with the peripheral edge portion closure areas of the vehicle door when the sheet is positioned over the trim panel in alignment therewith. Additionally, each of the tab members has a pressure sensitive adhesive applied thereto to permit them to releasably and adhesively engage the peripheral edge portions of the vehicle door.

Preferably, and in accordance with the preferred embodiment of the invention, the tab members are integral continuations of the sheet and the opposite surfaces of the tab portions have a release agent applied thereto to allow multiple numbers of the sheets to be placed in aligned, stacked relationship during manufacture, shipping, storage and handling.

In accordance with a further aspect of the invention, there is provided a method of protecting the door trim panel of a vehicle door of the type having laterally facing peripheral edge closure portions lying in planes generally perpendicular to the plane of the trim panel. The method includes providing a generally continuous and impervious sheet of a relatively thin, flexible plastic film having a length 1 and a width w which generally correspond to the height and width, respectively, of the door trim panel. The continuous sheet is also provided with a plurality of integral tab members which are sized to extend outwardly from the end portions of the sheet a distance d. In use, the sheet is placed over the trim panel and aligned along the length and width of the sheet to fully overlie the trim panel. Thereafter, the tab members are adhesively bonded to the peripheral edge portions of the door to maintain the sheet in position on the trim panel. Through the use of the subject protector sheet, it is possible to readily remove and reconnect the sheet during vehicle assembly and transport. This allows inspection and/or repair of the various door mounted assemblies and elements with the opportunity to merely replace the same protector sheet after such inspection and repair.

The protector sheets of the invention can also be provided with expansible areas designed to deflect laterally of the plane of the sheet to allow the sheets to conform to discontinuities on the door trim panel. For example, the expansible areas can overlie door handles and other raised areas of the door. Preferably, the expansible areas are provided by corrugations which are formed about the area which is intended to be deflected. By the use of the corrugations relatively deep and large contoured areas can be provided. Moreover, even those deflectors having relatively large corrugated areas can be stacked and stored in a relatively flat condition.

In accordance with a still further aspect of the invention, the central section of the protector sheet is provided with a band of corrugations which extend completely across the transverse or width dimension of the sheet. The band of corrugations has substantial width in the length direction of the sheet. The end portions of the sheet define the integral tab members. These end portions are preferably smooth and uncorrugated to facilitate connection of the tabs to the peripheral edge closure areas of the door.

By provision of the transversely extending corrugations, the protector sheets are able to better conform to the door irregularities and discontinuities. Further, the corrugations allow the sheets to be made from sheets having a shorter length dimension than would normally be required if the sheets were not corrugated. This can result in a significant savings in material. Additionally, the provision of the extensive area of corrugation reduces the overall (uninstalled) length dimension of the sheets to reduce the problems associated with storage and handling.

As is apparent from the foregoing, a primary object of the subject invention is the provision of a protector sheet article which is removable and replaceable after original installation.

A still further object is the provision of a protector sheet of the type described which can fully enclose the trim portion of a door panel while permitting repair and replacement access to the trim panel.

Yet another object of the invention is the provision of a protector sheet of the type described which is simple and inexpensive to manufacture.

A still further object of the invention is the provision of a method of using a protector sheet to fully enclose and protect the internal trim panel of a vehicle door by using the laterally facing painted door closure areas for connection of the protector sheet.

Yet another object is the provision of a door trim panel protector sheet which can be easily removed without leaving scraps of the sheet extending from under the edges of the trim panel.

The above and other objects and advantages will become apparent from the following description when read in conjunction with the accompanying drawings wherein.

Figure 2:
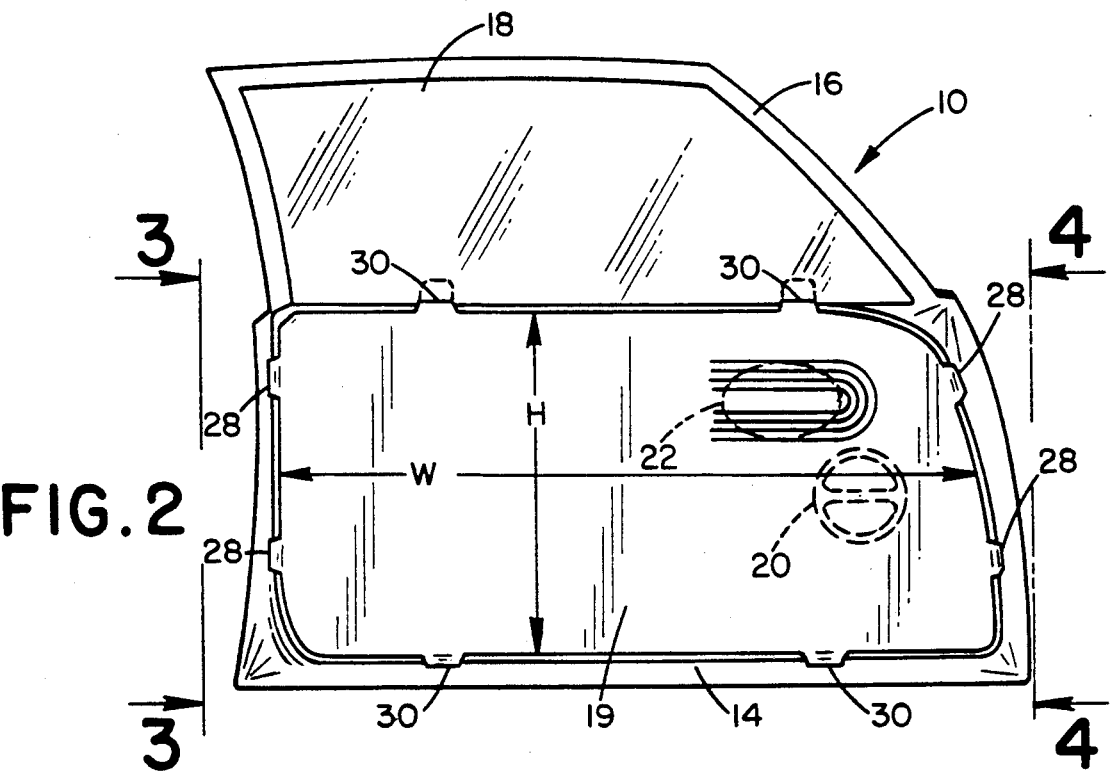
FIG. 2 is an elevational view of the interior of a vehicle door showing a protector sheet of the type illustrated in FIG. 1 mounted in position over the interior trim panel of the door.
Figure 3:
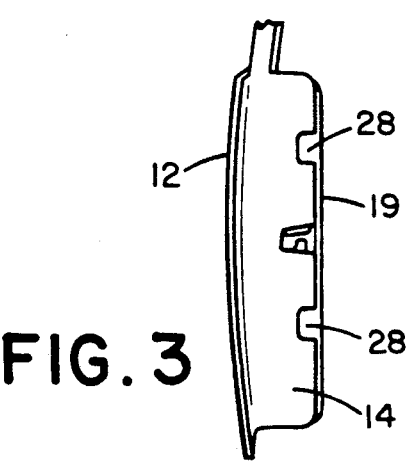
FIG. 3 is an elevational view taken on line 3—3 of FIG. 2 showing the peripheral edge portion of the door.
Figure 4:
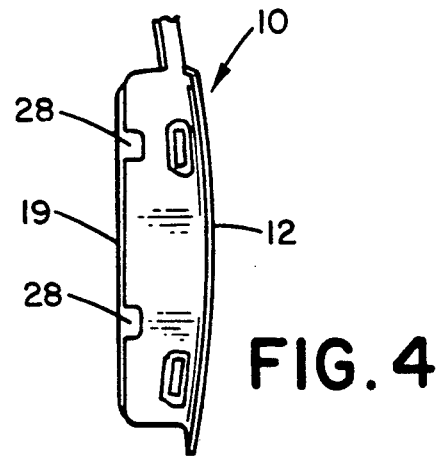
FIG. 4 is an elevational view taken on line 4—4 of FIG. 2; and, FIG. 5 is a plan view like FIG. 1 but showing a modified form of the invention.

Referring more particularly to the drawings wherein the showings are for the purpose of illustrating a preferred embodiment of the invention only, and not for the purpose of limiting same, FIGS. 2–4 show the overall arrangement of a typical vehicle door to which the protector article and method of the subject invention are particularly suited. As shown, the door comprises an outer shell member or skin panel 12 which is joined to a peripherally continuous inner frame or shell 14 that includes a suitable window receiving frame and gasket assembly 16. A window 18 is illustrated in position in the frame and gasket assembly 16.

The shell or frame 14 extends inwardly from the interior surface of the outer door shell 12 and in combination therewith defines the door which houses the various latch mechanisms, window operating assemblies and the like. The interior face of the door is closed by an inner panel of frame 14 which may carry such items as radio speaker 20, a window operating and door latch console assembly 22 and the like. In any event, an inner door trim panel 18 overlies the inner panel of frame 14 and is an exposed decorative portion of the door. Typically, the trim panel 19 is covered with a fabric or the like and must be protected during vehicle assembly and shipment to the ultimate vehicle purchaser. As discussed earlier, prior to the present invention, protector sheets have been connected to the door trim panel by being positioned over the panel and having the ends of the sheet pulled behind the panel and fastened to the clips which serve to join the panel to the door frame assembly 14. The trim panel with the protector sheet in place thereon was then mounted to the door frame and the protector sheet was semipermanently installed with the trim panel. When the vehicle finally arrived at the dealership, the trim panel was removed by tearing it from its connected position on the mounting clips. Normally the end portions of the sheet could be pulled from behind the panel so that no visible remains of the protector sheet were present.

A problem with this particular type of protector sheet connection and mounting was that if it became necessary to repair or service any of the door components prior to delivery to the customer, it was not possible to reinstall the protector sheet. That is, once the sheets were removed they could not be reused without major disassembly and reassembly of the door trim panel.

Figure 1:
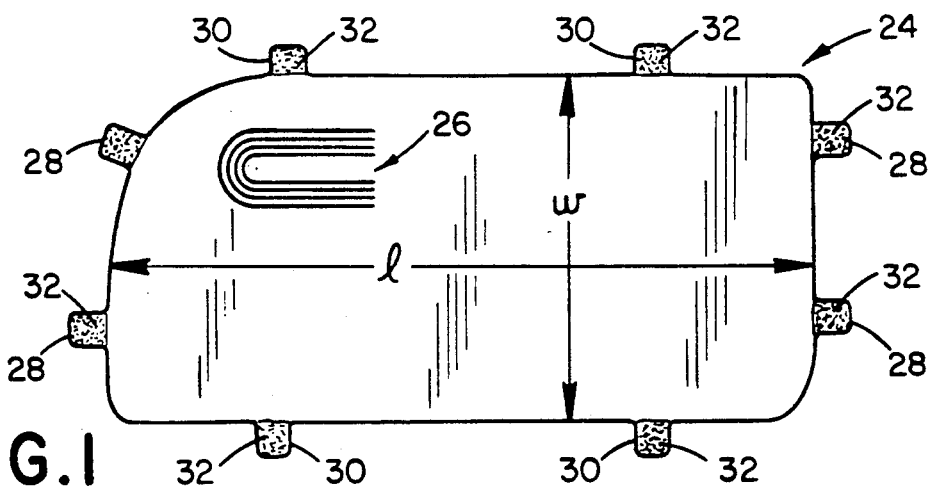
FIG. 1 is plan view of a protector sheet article formed in accordance with the subject invention.

FIG. 1 shows a protector sheet article formed in accordance with a preferred embodiment of the invention that overcomes the problems discussed earlier. In particular, the protector sheet article 24 generally comprises a continuous, relatively thin and impervious sheet of a suitable plastic film such as polyethylene, polypropylene, or the like. The sheet has a general overall length l which is at least substantially as great as the width W of the door trim panel 18. In addition, the sheet has a width w which is at least as great or even slightly greater than the height H of the door trim panel 19. Preferably, the sheet is provided with one or more pocket forming sections such as section 26 which are formed and positioned in accordance with the teachings of the commonly assigned prior U.S. Pat. No. 4,696,848 which is incorporated herein by reference. In the subject embodiment, the area 26 is designed with an array of corrugations extending thereabout so that it provides an outwardly extending bulge or pocket that can overlie the door latch and window operating mechanism shown somewhat diagrammatically at 22.

The corrugations which function to allow lateral deflection of predetermined areas to provide bulges or contours do not prevent the sheets from being stacked and/or maintained in a relatively flat condition. Also, the deflectable areas do not affect the ability of the sheets to be adhesively mounted.

FIG. 1 illustrates the inner face of the protector sheet 24. At least the opposite ends are, as shown, provided with outwardly extending integral tab portions 28. A plurality of the tabs 28 are positioned to extend generally longitudinally outwardly from the ends of the sheet at suitably spaced positions. Additional tab portions 30 can, if desired, by formed as illustrated on the upper and lower edges of the protector sheet 24. Preferably, the various tabs 28, 30 are provided on their inner face with a suitable pressure sensitive adhesive identified generally with the reference numeral 32. The subject embodiment preferably has the pressure sensitive adhesive only on the tab portions of the sheet. However, it is contemplated that additional spots of adhesive could be applied at other locations if desired or needed. Additionally, the opposite sides of the tab portions 28, 30 are preferably treated so as to readily release from the pressure sensitive adhesive so that a plurality of the sheets can be stacked in aligned relationship to form packages or assemblies of the sheets to facilitate manufacture, storage and handling.

In accordance with the subject invention, the tabs 28, 30, preferably have a length such that when the protector sheet is placed in position over the inner door panel the tabs can extend into engagement with the laterally facing peripheral closure areas of the door which extend generally perpendicular to the plane of the trim panel. In this regard, attention is directed to FIGS. 3 and 4 wherein the tabs 28 are illustrated as suitably engaged with the doors peripheral edge closure areas. These areas are typically merely painted metal surfaces and provide a very suitable bonding surface for the pressure sensitive adhesive. In addition, if desired, and if the sheet is provided with tabs 30, these tabs can also be brought over the edge of the inner door panel and engaged with the lower edge closure area and/or the window surface along the upper edge thereof.

Because of the tabs and their pressure sensitive adhesive, the sheets can be readily removed, replaced, and/or repositioned. In addition because the tabs are positioned to engage on the painted metal surfaces of the closure area there is no possibility of damage to the fabric of the trim panels. In addition the smooth painted surfaces of the closure areas provides an extremely desirable bonding surface for the pressure sensitive adhesive.

FIG. 5 illustrates a modified form of the invention which allows the protector sheets to be formed from smaller starting sheets and which produces a product that conforms better to surface irregularities. In this showing, components corresponding to those of the FIG. 1-4 embodiment have been identified with the same reference numeral differentiated by a prime (') suffix. Parts so identified are to be considered the same as those previously described unless otherwise noted. In particular, in accordance with the FIG. 5 embodiment, the sheet 24' is provided throughout its central section 40 with a relatively wide band 42 of small and closely spaced corrugations 44. Preferably, all of the corrugations 44 extend completely across the transverse or width dimension w of the sheet from the lower edge 46 to the upper edge 48. It should be appreciated that under certain circumstances, it may be desirable to subdivide the band 42 into a number of narrower bands and/or to terminate the individual corrugations or bands of corrugations inwardly from the upper or lower edges.

The end portions 50, 52 of the sheet which forms the protector sheet 24' are preferably left smooth and uncorrugated as shown. Additionally, each entire end portion 50, 52 is arranged to function as an attachment tab or tabs but with suitable cut-outs at 54 and 56 to conform the ends of the sheet to door latch and hinge locations.

Preferably, the entire end strip or tab area is coated with a suitable pressure sensitive adhesive as indicated at 32'. While tabs could be provided along the upper and lower edges 48, 46 respectively, the wide and extensive tab areas along the ends function satisfactorily and confine the attachment adhesive to the closure areas of the door.

The use of the extensive area of corrugations allows the starting size of the sheet used for making the protector sheet to be significantly reduced. That is, if the installed length of the sheet must be "l", than the starting length for sheet is 1 less the length which is, or can be, gained as a result of expanding the corrugating of the central portion.

The corrugated central section also provides the advantage that a single style or size of protector can be used on several different vehicles, e.g., vehicles having doors of differing widths. This is so because of the fact that the corrugations allow the length of the resulting protector sheet to be varied merely by the degree of force applied to the ends to stretch the corrugations.

The invention also contemplates that corrugations could, if desired, be placed to allow individual spots or sections of the end portions to be expanded in the vertical or horizontal directions.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A protector sheet article intended for application to an inner door trim panel of a vehicle door to prevent soiling or damage to the trim panel during vehicle assembly and shipping, said door having peripheral edge closure portions, and said trim panel having a height and width, said protector sheet article comprising:

a continuous sheet of relatively thin and flexible plastic film having an outer periphery with a width w and a length l, said width w being at least substantially as great as the height of said trim panel and said length l being less than the width of said trim panel, small and closely spaced corrugations extending in a relatively wide band across the width of said sheet in an amount and number to allow said sheet to be extended in length to greater than the width of said trim panel, the outer periphery of said sheet when in said extended condition having a size and shape generally corresponding to the size and shape of said trim panel;

tab portions extending from the periphery of said sheet at least along the end portions thereof, said tab members being of a length sufficient to extend over and beyond the side edges of said trim panel for engagement with the peripheral edge portion closure areas of said vehicle door; and, pressure sensitive adhesive applied to at least said tab portions to allow them to be adhesively joined to the peripheral edge closure areas of said door.

2. The protector sheet article as defined in claim 1 wherein said tab members are integral continuations of said sheet.

3. The protector sheet article as defined in claim 1 wherein smooth uncorrugated end portions of said sheet define said tab portions.

4. The protector sheet article as defined in claim 1 wherein said tab portions have pressure sensitive adhesive on only one face thereof, the opposite face having a release agent applied thereto to allow said sheets to be placed in aligned, stacked relationship.

5. The protector sheet article as defined in claim 1 wherein said small closely spaced corrugations extend completely across the width of said sheet.

6. A method of protecting a door trim panel of a vehicle door from dirt and damage during assembly and shipping, said door having laterally facing peripheral edge closure areas extending generally perpendicular to said trim panel and said trim panel having a height and width, comprising the steps of:

a) providing a continuous sheet of relatively thin and flexible plastic film having an outer periphery with a width w and a length l, width w being at least substantially as great as the height of said trim panel and length l being at substantially less than the width of said trim panel, b) providing integral tab portions to extend outwardly from said sheet, said tab members having a pressure sensitive adhesive thereon, c) providing a band of transversely extending corrugations across the width of said sheet in an amount sufficient to allow said sheet to be extended in length to at least the width of said trim panel;

d) placing said sheet over said trim panel and aligning the length and width of said sheet with the width and height, respectively of said door; and, e) extending the length of said sheet to cover the width of said door and bonding said tab members to the peripheral edge portion closure areas of said door.

7. The method as defined in claim 6 wherein said tab portions are integral end portions of said sheet.

8. The method as defined in claim 6 wherein said sheet is stretched across said trim panel and wherein said tab portions are bonded only to the vertically extending peripheral edge portion closure areas of said door.

* * * * *